(12) United States Patent
Larbi et al.

(10) Patent No.: US 10,279,366 B2
(45) Date of Patent: May 7, 2019

(54) METHOD AND DEVICE TO DETECT CLOGGED NOZZLES

(71) Applicant: Arkansas State University—Jonesboro, State University, AR (US)

(72) Inventors: Peter Ako Larbi, Jonesboro, AR (US); Chin Nee Vong, Columbia, MO (US)

(73) Assignee: Arkansas State University—Jonesboro, State University, AR (US)

( * ) Notice: Subject to any disclaimer, the term of this patent is extended or adjusted under 35 U.S.C. 154(b) by 0 days.

(21) Appl. No.: 15/911,061

(22) Filed: Mar. 2, 2018

(65) Prior Publication Data

US 2018/0250698 A1    Sep. 6, 2018

Related U.S. Application Data

(63) Continuation-in-part of application No. 62/466,335, filed on Mar. 2, 2017, and a continuation-in-part of application No. 62/532,880, filed on Jul. 14, 2014.

(51) Int. Cl.
| | |
|---|---|
| *B05B 15/50* | (2018.01) |
| *B05B 12/00* | (2018.01) |
| *A01M 7/00* | (2006.01) |
| *A01C 23/04* | (2006.01) |
| *A01M 21/04* | (2006.01) |
| *G01F 1/64* | (2006.01) |

(52) U.S. Cl.
CPC ............ *B05B 15/50* (2018.02); *A01C 23/047* (2013.01); *A01M 7/0042* (2013.01); *A01M 7/0089* (2013.01); *A01M 21/043* (2013.01); *B05B 12/008* (2013.01); *G01F 1/64* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,311,722 A | * | 3/1967 | Hammerschmidt .. | G01F 23/241 200/61.05 |
| 3,399,399 A | * | 8/1968 | Apfelbaum ........... | G01F 23/241 320/160 |
| 3,757,316 A | * | 9/1973 | Fiorenzo .............. | G08B 21/187 340/608 |
| 4,392,128 A | * | 7/1983 | Young ..................... | E03F 7/00 137/557 |
| 4,662,540 A | * | 5/1987 | Schroter ................. | B67D 7/32 137/12 |

(Continued)

*Primary Examiner* — An T Nguyen
(74) *Attorney, Agent, or Firm* — Schrantz Law Firm, PLLC; Stephen D. Schrantz

(57) ABSTRACT

The nozzle clog detection device, system, and method detect if a liquid flows through a nozzle via conduction of electricity. The clog detector provides an open circuit at an opening between two conductors. The two conductors are placed in the flow path of a liquid flowing from a nozzle. The liquid from the nozzle conducts electricity. The liquid flowing through the opening between the conductors closes the circuit. An alert system notifies the user whether liquid is flowing through the nozzle. The system detects flow of liquid from multiple nozzles and identifies the nozzles from which liquid flows. A break in the circuit at the opening between the conductors indicates that the liquid is not flowing sufficiently enough to close the circuit.

13 Claims, 12 Drawing Sheets

(56) References Cited

U.S. PATENT DOCUMENTS

| | | | | |
|---|---|---|---|---|
| 4,961,068 A | * | 10/1990 | Hendricksen | E03F 7/00 |
| | | | | 340/608 |
| 5,069,042 A | * | 12/1991 | Stuchlik, III | F24F 13/22 |
| | | | | 4/679 |
| 5,245,946 A | * | 9/1993 | Hoefelmayr | A01J 5/01 |
| | | | | 119/14.15 |
| 5,522,229 A | * | 6/1996 | Stuchlik, III | E03C 1/28 |
| | | | | 62/127 |
| 7,821,411 B1 | * | 10/2010 | Ward | G01F 23/268 |
| | | | | 340/616 |
| 2009/0206015 A1 | * | 8/2009 | Wang | B01D 35/143 |
| | | | | 210/87 |
| 2016/0339695 A1 | * | 11/2016 | Chen | B41J 2/14032 |
| 2018/0093263 A1 | * | 4/2018 | Bonzon | B01L 3/0275 |

* cited by examiner

METHOD AND DEVICE TO DETECT CLOGGED NOZZLES

CROSS-REFERENCE TO RELATED APPLICATIONS

This application claims priority to and is a continuation in part of U.S. Patent Application No. 62/466,335 entitled "Method and Device to Detect Clogged Nozzles" filed on Mar. 2, 2017. This application claims priority to and is a continuation in part of U.S. Patent Application No. 62/532,880 entitled "Method and Device to Detect Clogged Nozzles" filed on Jul. 14, 2017.

STATEMENT REGARDING FEDERALLY SPONSORED RESEARCH OR DEVELOPMENT

This application contains a subject invention made, in part, with Government support under Award No. 1005836 awarded by the U.S. Department of Agriculture, National Institute of Food and Agriculture (USDA-NIFA).

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention is related to agricultural systems. More specifically, the present invention is related to spray systems for agriculture. The present invention detects clogs in agricultural spray systems. The system then alerts the user to the clogged nozzle and identifies the clogged nozzle to the user. The user repairs the identified nozzle to avoid losses in agrochemicals and time.

Most agrochemical liquids, including but not limited to herbicides, pesticides, fungicides, crop protection agents, and fertilizers, are sprayed onto target, such as the crops or the ground. Agricultural sprayers apply the agrochemicals at a specified application rate. The liquid may be in the form of a solution or mixture, with a carrier liquid (such as water) being mixed with one or more active ingredients (such as a herbicide, fertilizer, fungicide and/or a pesticide).

Typically, the agrochemical liquid is supplied by powered pumps to simple or complex orifice nozzles that atomize the liquid stream into spray droplets. Nozzles are often selected primarily on the desired range of flow rates needed for the job and secondarily on the range of liquid droplet size spectra and spray distribution patterns that the nozzles produce.

Agricultural sprayers may be pulled as an implement or self-propelled. Such sprayers may include a tank, a pump, a boom assembly, and a plurality of nozzles carried by the boom assembly at spaced locations. Additional booms, such as wing booms with additional nozzles may be implemented on the sprayer to increase the area treated by the sprayer.

The spray nozzles on the boom disperse one or more liquids from a reservoir carried by the sprayer. Each nozzle connects to a conduit through which the fluid flows from the reservoir to the nozzle. Each nozzle distributes the fluid to the field in a droplet or spray mist form.

One or more of the nozzles can become clogged during operation. The nozzles are typically optimized to reduce application overlap during the spray operation. A clogged nozzle may prevent the liquid from being properly applied. The user must then reapply the liquid. Such reapplication requires additional fuel, labor costs, and additional liquids. A system, device, and method of detecting clogged nozzles are needed to avoid liquids not being properly applied.

II. Description of the Known Art

Patents, patent applications, and references disclosing relevant information are disclosed below. These patents, patent applications, and references are hereby expressly incorporated by reference in their entirety.

U.S. Pat. Nos. 7,149,639; 6,393,336; 7,311,004; 7,250,087; 8,894,948; 7,070,254; 6,423,926 and U.S. Publication Nos. 2005/0234673; 2015/0351375; 2005/0000277; 2010/0098590; and 2004/0206179 and other patents including WO2004081499; CA2517031; WO2008066568; CN101688873; WO2009001463; EP2184610; CN1297405; CN1509879; and WO2009001463.

Larbi, P. A. 2016. Additions to The PAL-MS Airblast Spray Dispersion Model. *Transactions of the ASABE*. Manuscript No. MS-11621-2015. In Review.

Larbi, P. A., R. Ehsani, M. Salyani, J. M. Maja, A. R. Mishra, and J. Camargo Neto. 2013. Multispectral based leaf detection system for spot sprayer application to control citrus psyllids. *Biosystems Engineering* 116(4):509-517.

Larbi, P. A. and M. Salyani. 2013. Discretization for a Spray Deposition Model: Criteria for Temporal and Spatial Differencing. *Computers and Electronics in Agriculture* 9:35-39.

Khot, L. R., R. Ehsani, J. Landers, G. Albrigo, and P. A. Larbi. 2012. Spray Pattern Investigation of an Axial-Fan Airblast Precision Sprayer Using A Modified Vertical Patternator. *Applied Engineering in Agriculture* 28(5): 647-654.

Khot, L. R., R. Ehsani, G. Albrigo, P. A. Larbi, A. Landers, J. Campoy and C. Wellington. 2012. Air-Assisted Sprayer Adapted for Precision Horticulture: Spray Patterns and Deposition Assessments in Small-Sized Citrus Canopies. *Biosystems Engineering* 113(1): 76-85.

Larbi, P. A. and M. Salyani. 2012. CitrusSprayEx: An Expert System for Planning Citrus Spray Applications. *Computers and Electronics in Agriculture* 87:85-93.

Larbi, P. A. and M. Salyani. 2012. Model to Predict Spray Deposition in Citrus Airblast Sprayer Applications—Part 1: Spray Dispersion. *Transactions of the ASABE* 55(1): 29-39.

Larbi, P. A. and M. Salyani. 2012. Model to Predict Spray Deposition in Citrus Airblast Sprayer Applications—Part 2: Spray Deposition. *Transactions of the ASABE*. 55(1): 41-48.

Khot, L. R., M. Salyani, M. Farooq, T. W. Walker, R. D. Sweeb, P. A. Larbi, V. Smith, R. Pomolis, C. A. Stoops. 2011. Assessment of Aerosol Deposition and Movement in Open Field Conditions. *Agricultural Engineering International: CIGR Journal* 13(3).

Larbi, P. A. 2015. An Update on an Airblast Spray Dispersion Model. *ASABE Paper No.* 152187337. St. Joseph, Mich.: ASABE.

Salyani, M. and P. A. Larbi. 2013. Model to predict spray deposition in citrus orchard applications. *SuProFruit-2013: Spray Application techniques in Fruit Growing*, Valencia, Spain.

Larbi, P. A., R. Ehsani, M. Salyani, J. M. Maja, A. R. Mishra, and J. Camargo Neto. 2012. Young Leaf Detection for Spot Spray Treatment of Citrus Canopies to Control Psyllids. *International Conference for Precision Agriculture, Paper Abstract No.* 1210.

Larbi, P. A. and M. Salyani. 2010. Development of an Expert System for Citrus Spray Applications. *ASABE Section Meeting Paper No.* FL10-124: 13 p.

Larbi, P. A. and M. Salyani. 2010. Spray Model to Predict Deposition in Air-Carrier Sprayer Applications. *ASABE Paper No.* 1008319: 24 p. Magazine (1)

Larbi, P. A. 2015. Variable-Rate Application and Swath Control Technology. Resource Magazine, July/August 2015 Issue [http://elibrary.asabe.org/azdez.asp?JID=11&AID=45635&CID=rm2015&v=22&i=4&T=2&redirType=]

Vong, C. N. & P. A. Larbi. "Sprayer Rate Controller Performance Test". 2016 Renewable Energy Conference, Jonesboro, Ark., Oct. 14, 2016. (Poster)

Larbi, P. A. "Demonstration of Air Blast Sprayer/Calibration and Coverage". Specialty Crop and Forage Sprayer Technology In-service Training, South West Research and Extension Center, University of Arkansas, Batesville, Ark., Mar. 29, 2016. (Demo)

Larbi, P. A. "Adjusting Coverage in Airblast Spraying". Specialty Crop and Forage Sprayer Technology In-service Training, South West Research and Extension Center, University of Arkansas, Batesville, Ark., Mar. 29, 2016. (Oral)

Larbi, P. A. "Demonstration of Air Blast Sprayer/Calibration and Coverage". Specialty Crop and Forage Sprayer Technology In-service Training, South West Research and Extension Center, University of Arkansas, Hope, Ark., Sep. 16, 2015. (Demo)

Larbi, P. A. "Adjusting Coverage in Airblast Spraying". Specialty Crop and Forage Sprayer Technology In-service Training, South West Research and Extension Center, University of Arkansas, Hope, Ark., Sep. 16, 2015. (Oral)

Manne, S. and P. A. Larbi. "Drift Potential of Selected Spray Nozzles Used in Modern Agricultural Applications". Create@State 2015, Jonesboro, Ark., Apr. 7, 2015. (Poster)

Larbi, P. A. "Orchard Application Model", Modeling of Pesticide Application Workshop, Pittsburgh, Pa., Feb. 3, 2014. (Oral)

Larbi, P. A. & M. Salyani. Modeling Citrus Spray Application, 12th Annual Environmental Engineering Sciences Poster Symposium (March 2010), University of Florida, Gainesville, Fla., Mar. 25, 2010. (Poster)

Larbi, P. A. & M. Salyani. "Approximating citrus tree canopy volume", ASABE Agricultural Equipment Technology Conference, Orlando, Fla., Jan. 10-13, 2010. (Poster)

"Development of a model to predict spray deposition in airblast sprayer applications", Prosser, Wash., 2012.

"Development of a model for predicting spray deposition in airblast sprayer applications", Lake Alfred, Fla., 2011.

Vong, C. N. & P. A. Larbi. "Sprayer Rate Controller Performance Test". 2016 Renewable Energy Conference, Jonesboro, Ark., Oct. 14, 2016. (Poster).

The known art enables clog detection that has been performed internally. Therefore, the manufacturers of spray systems have been responsible for clog detection. Due to the small size of nozzle orifices, the nozzle orifices are prone to clogging while in use. Preventative and maintenance measures, such as cleaning of the nozzles, are performed rather than detecting the occurrence of nozzle clogging during spray application.

Nozzles may be checked to ensure that the nozzles are not clogged or worn out. However, these checks may not occur prior to every single application. Furthermore, these checks may not occur during the actual application. Clogging during application of the liquid may go unnoticed. Such clogging negatively impacts the outcome of the application.

SUMMARY OF THE INVENTION

The clog detection device of the present invention detects clogs in spray nozzles. These clog detection devices can attach around the nozzles to detect whether liquid is flowing from the nozzle. The working principle of this nozzle clogging detection system and method is based on the electric conductivity of water.

Water that is not pure will conduct electricity due to the presence of ions. Almost all water sources such as tap water, sea water, and groundwater contain a certain amount of ions that cause the water to conduct electricity. Water-based agrochemicals require mixing with water as a solvent before spraying. Groundwater or tap water normally serves as the water source for such a solvent. Therefore, such an agrochemical spray solution is potentially able to conduct electricity.

The clog detection device system and method detects clogs due to the conductive nature of the liquid passing through the nozzle. The clog detection device provides two conductors that are not connected to form an open electrical circuit.

The spray solution, water, or other liquid completes the open circuit. The spray liquid contacts the two conductors to allow the flow of the current across the conductors and the spray liquid.

An indicator, such as a light emitting diode (an LED), a light, a visual alert, an audio alert, an alarm, or other indicator, can be included in the circuit to indicate the presence or absence of water. The end result is a water sensor.

The clog detection device is constructed from mainly a cylindrical plastic body with the water sensor circuit (henceforth referred to as 'NCDD circuit' or 'the circuit') built into it. The device's body attaches to a nozzle body at the top to become one assembly. The circuit components install in cavities on the device's body with two prongs (naked metallic wires relatively more rigid than the remaining wires used in the circuit) piercing from outside of the body on opposite sides radially toward the axis of the cylindrical body.

The housing provides at least one fastener towards the upper portion of the housing. The fasteners may include but are not limited to two bolts and nuts as support, a thumbscrew for tightening the housing at the nozzle. The housing also provides a foam padding on the inner wall of the housing to surround the inner upper part of the housing to reduce the likelihood of damaging the nozzle body. Foam padding is also attached to the fasteners for cushioning.

The circuit includes a male connector for power source, two conductors positioned within the flow path of the spray from the nozzle's orifice at the lower portion of the body and an indicator, such as an LED (light-emitting diode) that lights up when there is spray from the nozzle. The device prototype is attached to a nozzle using the attachment as described. When the nozzle starts spraying and the spray contacts the two conductors, the LED will light. When the nozzle is clogged and/or discharging no spray, the LED remains off.

The prongs are collinear and separated by a small gap with their axis being perpendicular to the axis of the nozzle's orifice. When the nozzle is spraying, a small displacement between the prongs and the nozzle tip allows the developing spray (initial portion of the water exiting from the nozzle), which is conical in shape for a circular orifice and continuous, to make contact with the prongs (FIG. 1). Since the developing spray is continuous, the water closes the circuit allowing the flow of current.

The present also provides a system with multiple flow detection devices. To monitor each nozzle along a boom of a sprayer, multiple flow detection devices are needed. Each device attaches to a nozzle to monitor the flow of the spray from the nozzle. The number of flow detection devices required depends upon the number of nozzles to be monitored. Such a system provides a monitor and indicators that correspond to the status of each flow detection device and the nozzle monitored by the flow detection device.

If the two prongs touch, it produces a short circuit which eventually damages the LED. The water is a relatively poor conductor of electricity that acts as a resistor to minimize the current that passes through the prongs. The water reduces the likelihood of a short circuit.

Accordingly, it is an object of the present invention to increase the efficiency of agrochemical spray application.

It is another object of the present invention to reduce both under application and uneven application of agrochemical spray.

It is another object of the present invention to alert a user that a nozzle is clogged.

It is another object of the present invention to provide an effective method of detecting nozzle clogging while spraying agrochemicals.

It is another object of the present invention to provide a detection system and device that can be retrofitted onto existing equipment.

It is another object of the present invention to provide a device that attaches externally to the nozzle body.

It is another object of the present invention to simplify the process of installing a detection device.

It is another object of the present invention to provide a device that does not require in-line nozzle detection.

It is another object of the present invention to attach to the spray system without requiring modification of the internal system of an existing sprayer.

It is another object of the present invention to identify the clogged nozzle to the user.

It is another object of the preset invention to reduce the complexity of integrating clogged nozzle detection into existing sprayer equipment.

It is another object of the present invention to reduce the costs of detecting nozzle clogging.

It is another object of the present invention to provide a light weight clogged nozzle detection system.

It is another object of the present invention to reduce the time required to install and/or replace a clogged nozzle detection system.

These and other objects and advantages of the present invention, along with features of novelty appurtenant thereto, will appear or become apparent in the course of the following descriptive sections and the attached drawings.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
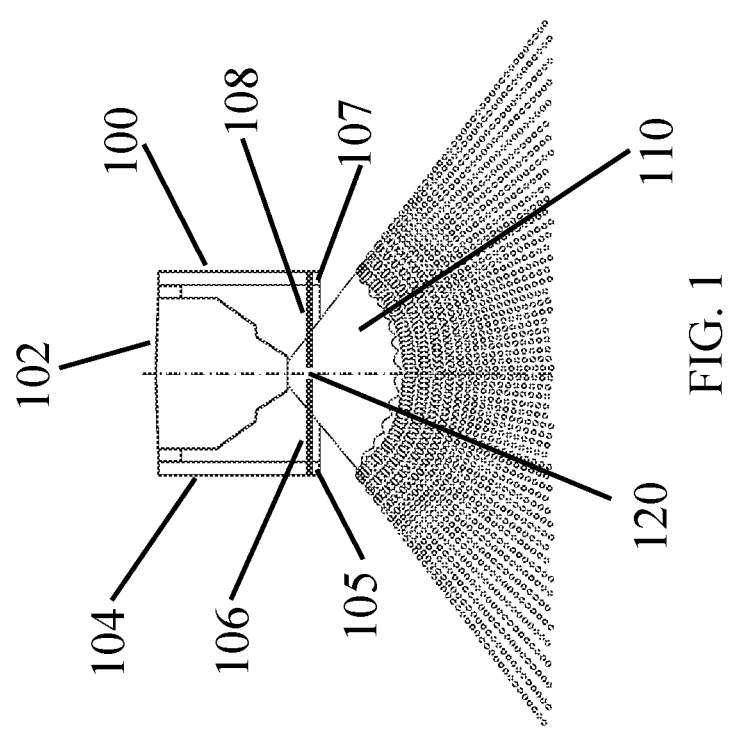
FIG. 1 is an environment view showing one embodiment of the present invention.

The clog detection device shown generally as 100 in FIG. 1 detects clogs in spray nozzles 102. The clog detection device 100 provides housing 104 that attaches around the nozzles 102 to detect whether liquid 110 is flowing from the nozzle 102. Detection bodies 105, 107 each provide at least one conductor, such as conductors 106, 108. In another embodiment, the detection bodies 105, 107 may provide multiple conductors, such as three conductors, spaced throughout the flow path of the spray from the nozzle.

Conductors 106, 108, such as prongs, provide an open circuit within the flow path of the spray from the nozzle. The liquid 110, such as water, a water based solution, an agrochemical spray, a liquid solution, a liquid compound, or other liquid, flows through the nozzle 102. The liquid 110 completes the opening 120 between conductors 106, 108 to complete the circuit. The clog detection device 100 operates due to the electric conductivity of the liquid 110.

Water that is not pure will conduct electricity due to the presence of ions. Almost all water sources such as tap water, sea water, and groundwater contain a certain amount of ions that cause the water to conduct electricity. Water-based agrochemicals require mixing with water as a solvent before spraying. Groundwater or tap water normally serves as the water source for such a solvent. Therefore, such an agrochemical spray solution is potentially able to conduct electricity.

The clog detection device 100 and method detects clogs due to the conductive nature of the liquid 110 passing through the nozzle 102. The clog detection device 100 provides two conductors 106, 108 extending from the housing 104 with an opening 120 to form an open electrical circuit. The spray liquid 110 exiting nozzle 102 contacts the two conductors 106, 108 allowing the current to flow across the conductors 106, 108 and the spray liquid 110.

The clog detection device 100 ("NCDD") is constructed from a housing 104, such as a cylindrical plastic body, with the water sensor circuit (henceforth referred to as 'NCDD circuit' or 'the circuit') built into it. The housing 104 attaches to a nozzle body at the top to become one assembly. The circuit components install into the housing 104 with two conductor apertures on the housing with the two conductors 106, 108, such as the two prongs (naked metallic wires relatively more rigid than the remaining wires used in the circuit) piercing from outside of the housing 104 on opposite sides radially toward the center of the housing 104.

The conductors 106, 108, such as the prongs, of one embodiment are collinear and separated by a small opening 120 with their axis being perpendicular to the axis of the nozzle's orifice. When the nozzle 102 is spraying, a small opening 120 between the prongs and the nozzle tip allows the developing liquid spray 110 (initial portion of the water exiting from the nozzle), which is conical in shape for a circular orifice and continuous, to make contact with the conductors 106, 108 (FIG. 1). Since the developing liquid spray 110 is continuous, the liquid 110 closes the circuit allowing the flow of current.

An indicator, such as a light emitting diode (an LED), a light, a visual alert, an audio alert, an alarm, or other indicator, can be included in the circuit to indicate the presence or absence of water. The liquid 110 contacts the conductors 106, 108 to complete the circuit. As the liquid 110 fails to close the circuit, the clog detection system 100 detects the open circuit. The end result is a water sensor that detects the flow of liquid 110 across the opening 120 between conductors 106, 108.

Contact of the two conductors 106, 108 to each other produces a short circuit that eventually damages the LED. The water is a relatively poor conductor of electricity that acts as a resistor to minimize the current that passes through the prongs. The water reduces the likelihood of a short circuit.

In most practical applications, the user applies the liquid through multiple nozzles. The user installs a clog detection system constructed from a clog detection device placed at each nozzle. Such a system requires multiple clog detection devices.

A clog detection device of one embodiment will be installed at each nozzle to detect sprayed liquid 110 from the nozzle. The conductors 106, 108 install adjacent to each nozzle 102. The installation of the conductors 106, 108 places each opening 120 in the path of liquid 110 through the respective nozzle. The system monitors the flow of liquid 110 through each nozzle 102.

In one embodiment, the system provides an alert system that detects flow of the liquid through each nozzle. The alert system may be an audible alert, such as an alarm, a beep, or other audio signal. The alert system may also be a visual alert, such as a light, LED, status update on a screen, or other visual alert. Another embodiment may provide both an audible alert and a visual alert.

The system monitors each nozzle. The alert system indicates which nozzle is clogged. The user can then identify the clogged nozzle and repair the nozzle. The alert system identifies the clogged nozzle so that the user can quickly locate and repair the nozzle without losing significant time.

As indicated above, multiple clog detection devices of one embodiment will be working concurrently at different nozzle locations. These clog detectors may share some resources such as a power source. Consequently, the circuit on the clog detection device must be completed by connecting to that external resource. As such, henceforth, the term Nozzle Clogging Detection System (NCDS) will be used to refer to the entire setup and NCDS circuit will refer to the circuit on the NCDD in connection with the rest of the system.

FIGS. 2-13 show different embodiments of the clogged nozzle detection system 100. Six NCDS circuit designs are established based on two circuit types (A and B) of three applicable configurations (1, 2, and 3) of the NCDD. The circuit designs are summarized in Table 1.

TABLE 1

Nozzle clogging detection system (NCDS) circuit design details.

| | Circuit Type | |
|---|---|---|
| Configuration | A: Circuit provides a 330-Ω resistor shown in FIGS. 2, 4, 6, 8, 10, and 12 | B: Circuit provides an BJT NPN transistor and 330-Ω resistor as shown in FIGS. 3, 5, 7, 9, 11, and 13 |
| 1: Single device configuration constructed from a standalone NCDD with an LED on it that operates independently with its own individual power source. | Constructed from a 9-volt power source, a 330-ohm resistor, an LED and two prongs (See FIGS. 2 and 8). | Constructed from a 9-volt power source, a 330-ohm resistor, a 2N222A NPN transistor, an LED, and two prongs (See FIGS. 3 and 9). |
| 2: Multiple device configuration constructed from a connectible NCDD with an LED that connects to a power source shared by additional devices in parallel. | Constructed from a shared 12-volt power source, a 330-ohm resistor, an LED, and two prongs (See FIGS. 4 and 10). | Constructed from a shared 12-volt power source, a 330-ohm resistor, a 2N222A NPN transistor, an LED, and two prongs (See FIGS. 5 and 11). |
| 3: Multiple device configuration constructed from a connectible NCDD with an LED that connects to a power source shared by additional devices in parallel and a second LED on a monitoring panel, in order to be operational. | Constructed from a shared 12-volt power source, a switch, a 330-ohm resistor, two LEDs, and two prongs (See FIGS. 6 and 12). | Constructed from a shared 12-volt power source, a switch, a 2N222A NPN transistor, a 330-ohm resistor, two LEDs, and two prongs (See FIGS. 7 and 13). |

FIGS. 2 and 8 show one embodiment with a resistor in the circuit with the flow indicator 118. The flow indicator 118 may be a light, an LED, a visual alert, or audible alert as indicated above. Power source 112, such as a battery, solar panel, power from the agricultural equipment, or other power source, provides power to the flow indicator 118. Opening 120 creates an open circuit 114. The liquid flows through the housing 104, across conductors 106, 108. The liquid capable of conducting electricity closes the circuit 114 as the liquid flows through opening 120. The liquid closes the circuit 114 allowing electricity to flow across the flow indicator 118 to indicate that nozzle is not clogged. If the flow is not sufficient to complete the circuit at opening 120, electricity is not supplied to flow indicator 118 such that flow indicator 118 is not powered.

Figure 3:
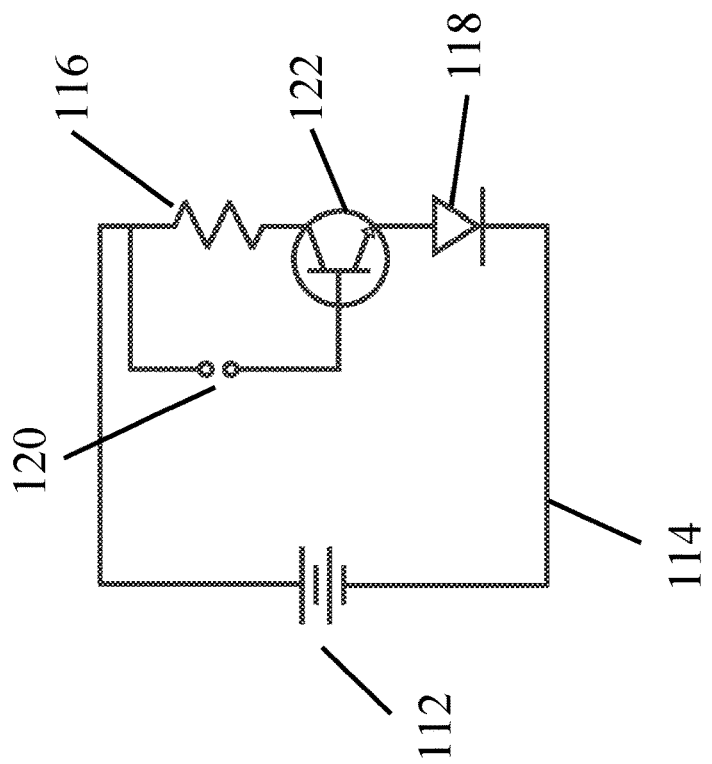
FIG. 3 is a circuit view showing one embodiment of the present invention.
Figure 9:
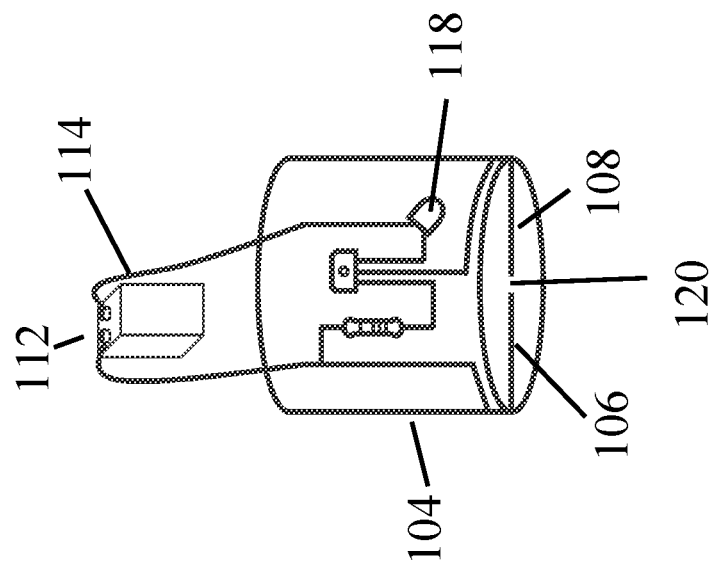
FIG. 9 is a schematic view showing one embodiment of the present invention.

FIGS. 3 and 9 show another embodiment that includes resistor 116 and transistor 122. As indicated above, housing 104 secures near the nozzle to place opening 120 in the flow path of the liquid from the nozzle. The liquid flows into opening 120 to close circuit 114. Power source 112 powers the flow indicator 118. The liquid closes the circuit 114 allowing electricity to flow across the flow indicator 118 to indicate that the nozzle is not clogged. If the flow is not sufficient to complete the circuit at opening 120, electricity is not supplied to flow indicator 118 such that flow indicator 118 is not powered.

Figure 2:
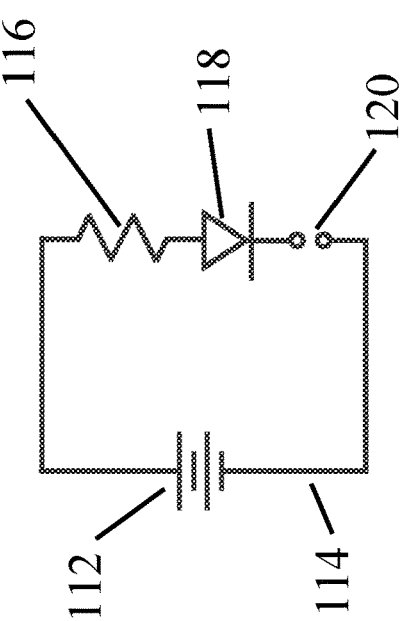
FIG. 2 is a circuit view showing one embodiment of the present invention.
Figure 4:
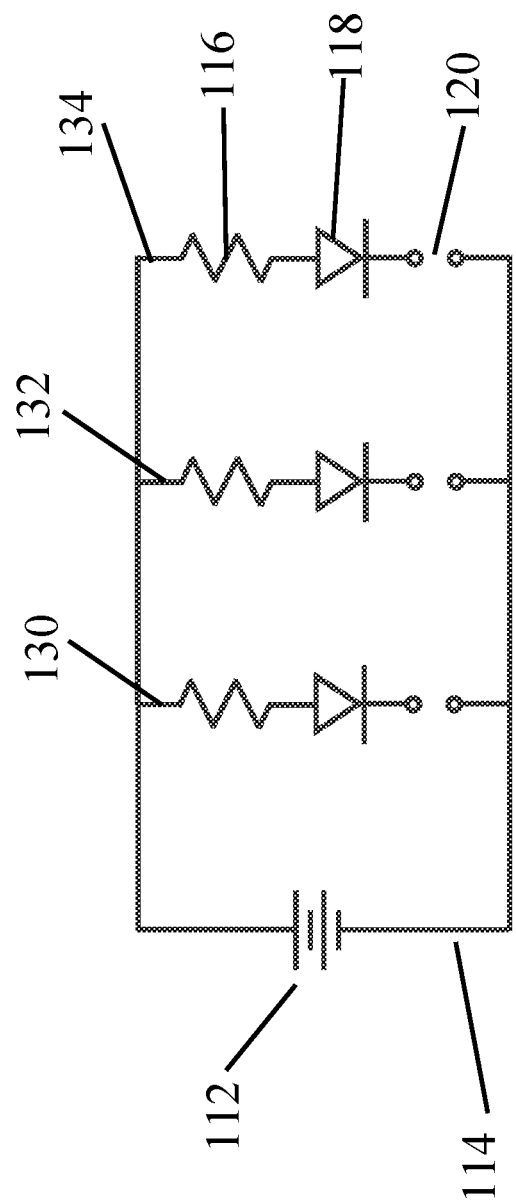
FIG. 4 is a circuit view showing one embodiment of the present invention.
Figure 8:
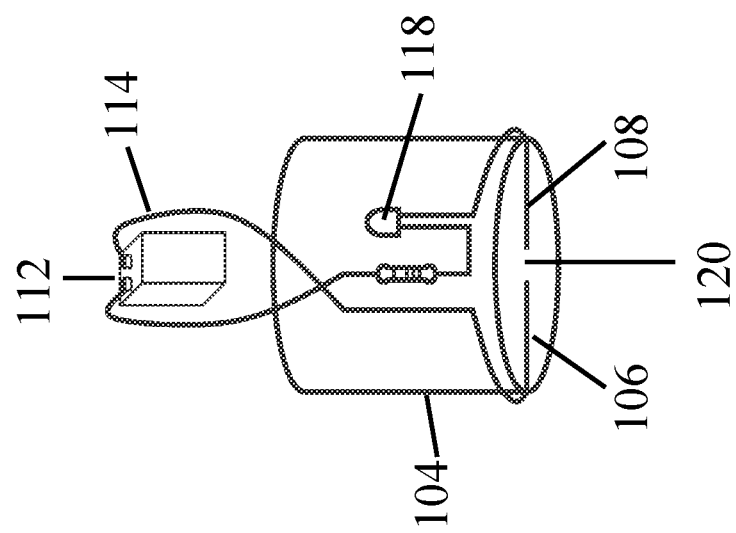
FIG. 8 is a schematic view showing one embodiment of the present invention.
Figure 10:
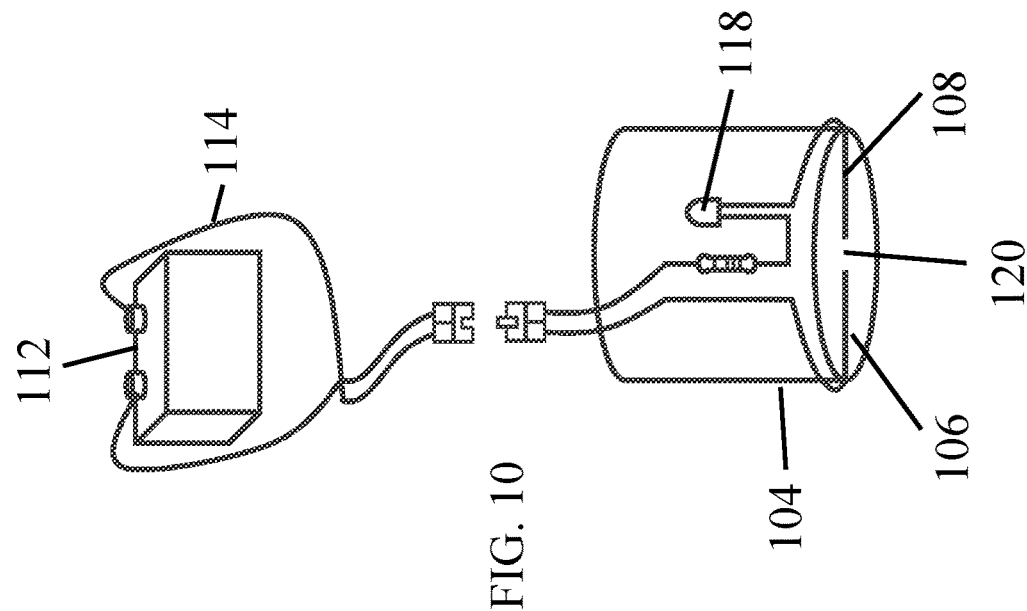
FIG. 10 is a schematic view showing one embodiment of the present invention.
Figure 12:
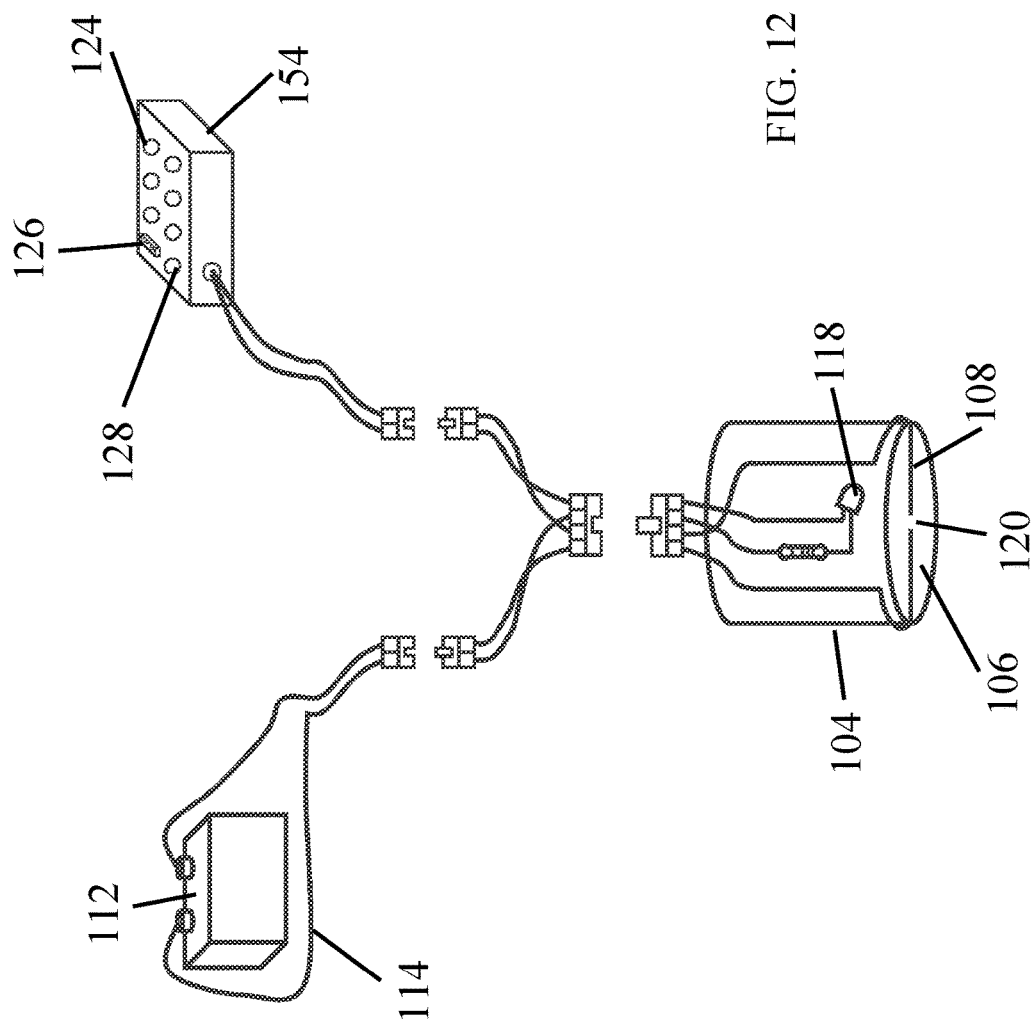
FIG. 12 is a schematic view showing one embodiment of the present invention.
Figure 13:
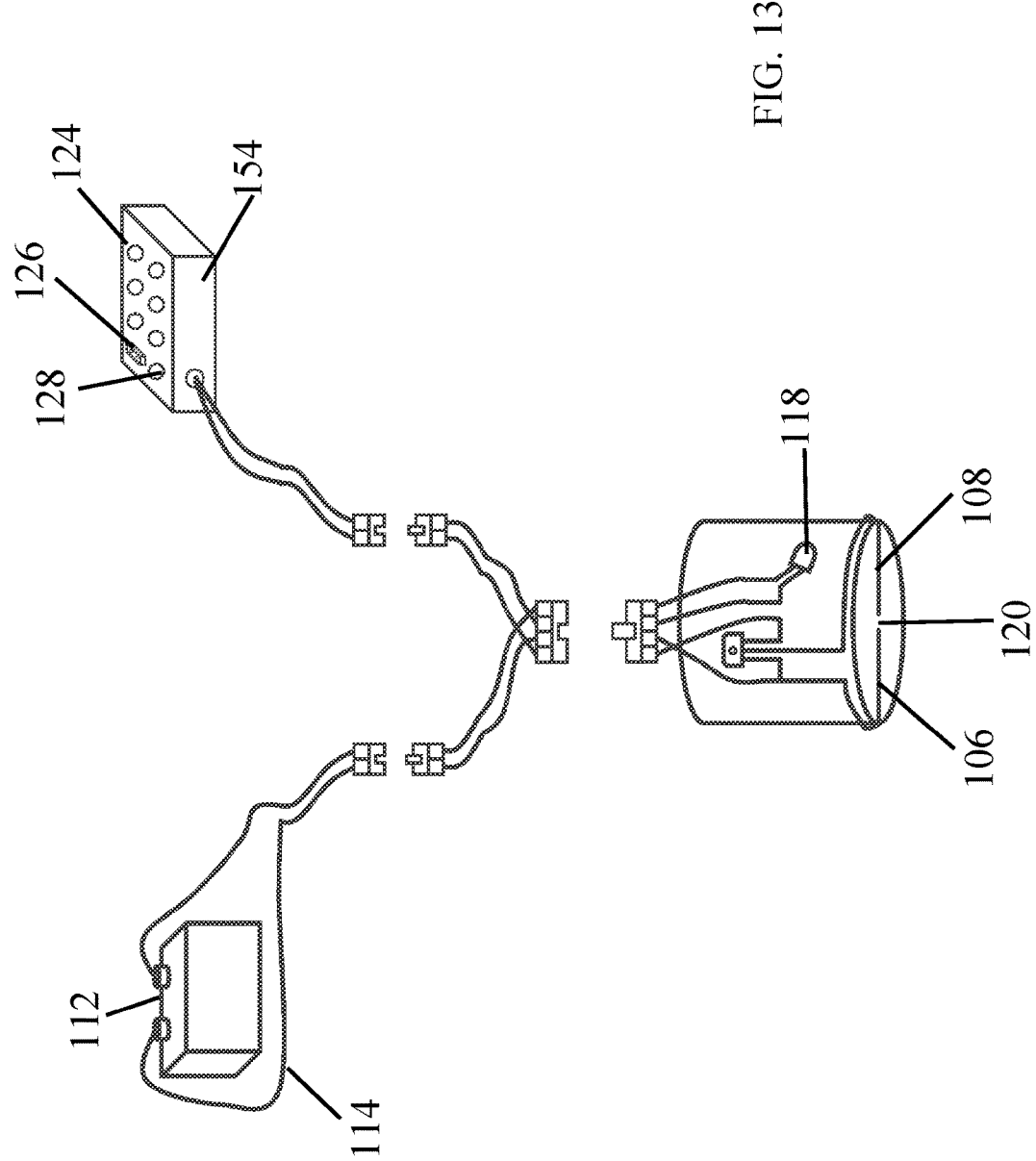
FIG. 13 is a schematic view showing one embodiment of the present invention.

FIGS. 4 and 10 show another embodiment that includes resistor 116 similar to FIGS. 2 and 8. As indicated above, housing 104 secures near the nozzle to place opening 120 in the flow path of the liquid from the nozzle. The liquid flows into opening 120 to close circuit 114. The liquid capable of conducting electricity closes the circuit 114 as the liquid flows through opening 120. The liquid closes the circuit 114 allowing electricity to flow across the flow indicator 118 to indicate that the nozzle is not clogged. If the flow is not sufficient to complete the circuit at opening 120, electricity is not supplied to flow indicator 118 such that flow indicator 118 is not powered.

FIGS. 4 and 10 show a system of clog detection devices 130, 132, 134 providing multiple indicators 118 placed at different nozzles. Each clog detection device 130, 132, 134 attaches in parallel with the power source 112. Each detection device 130, 132, 134 signals whether sufficient liquid flows across each opening 120 between the conductors 106, 108.

Figure 5:
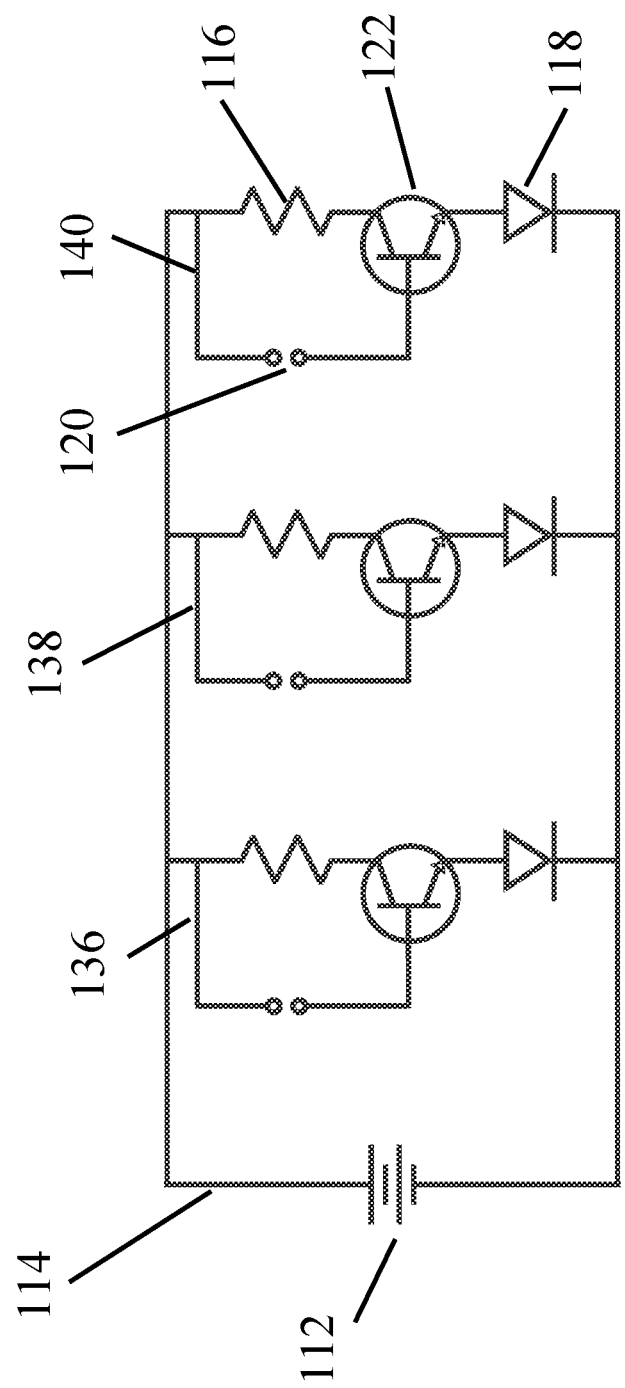
FIG. 5 is a circuit view showing one embodiment of the present invention.
Figure 6:
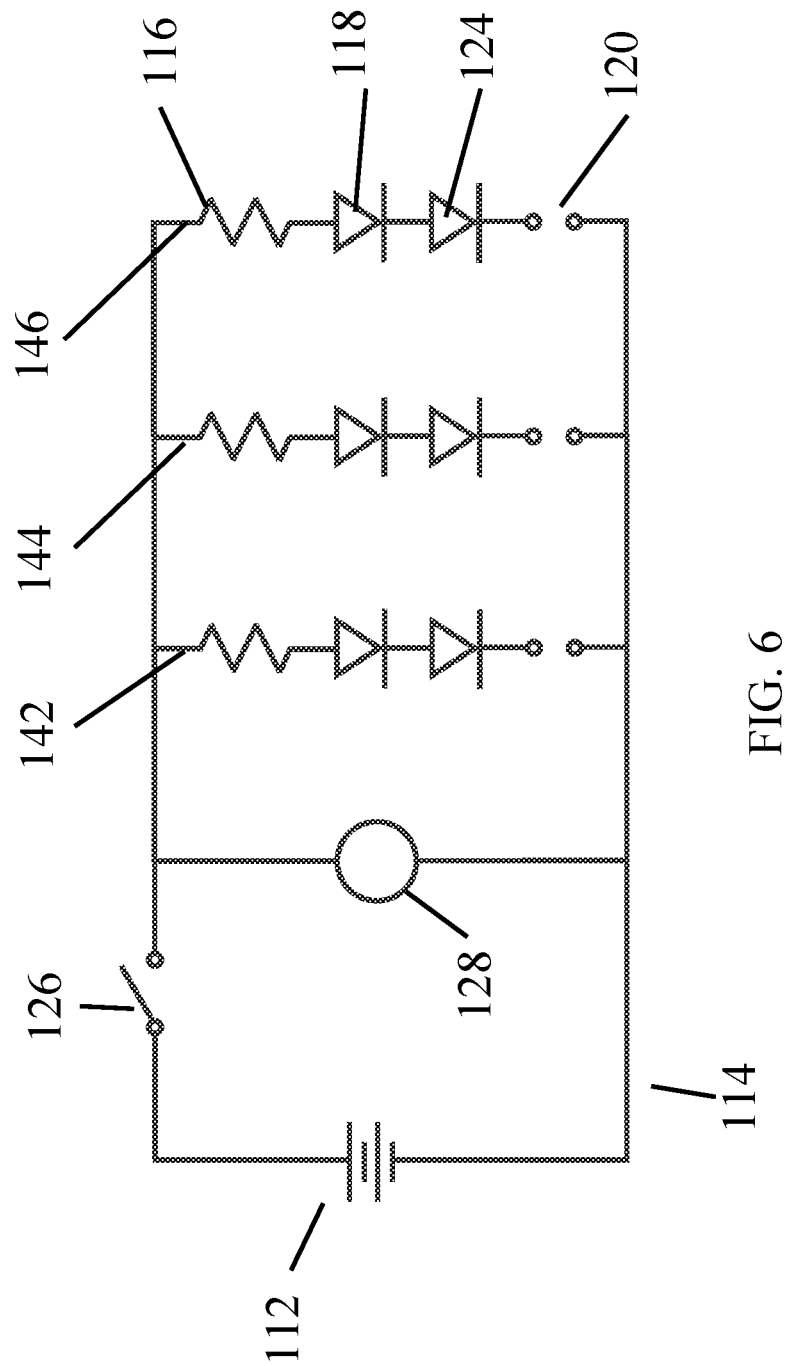
FIG. 6 is a circuit view showing one embodiment of the present invention.
Figure 7:
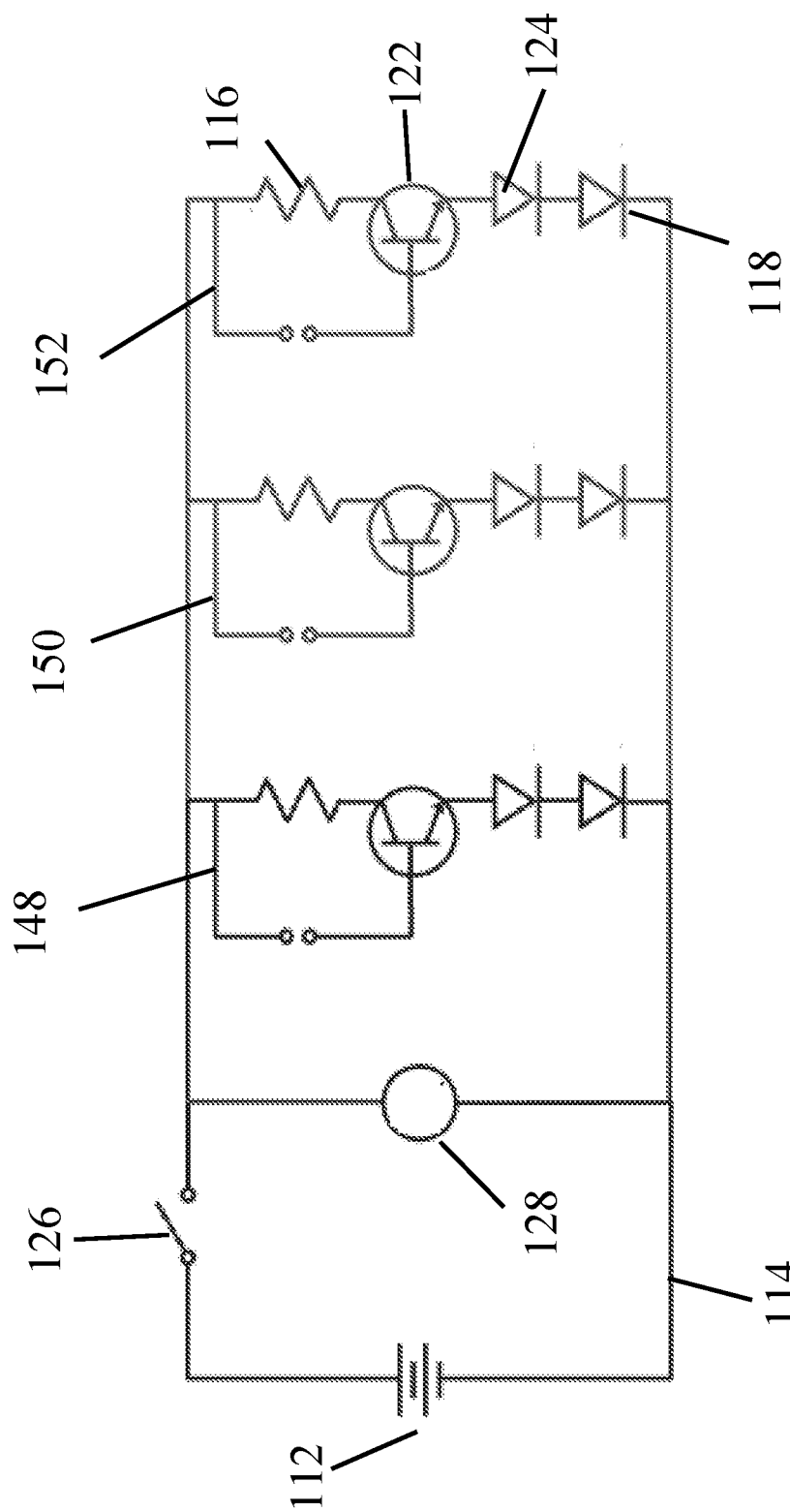
FIG. 7 is a circuit view showing one embodiment of the present invention.
Figure 11:
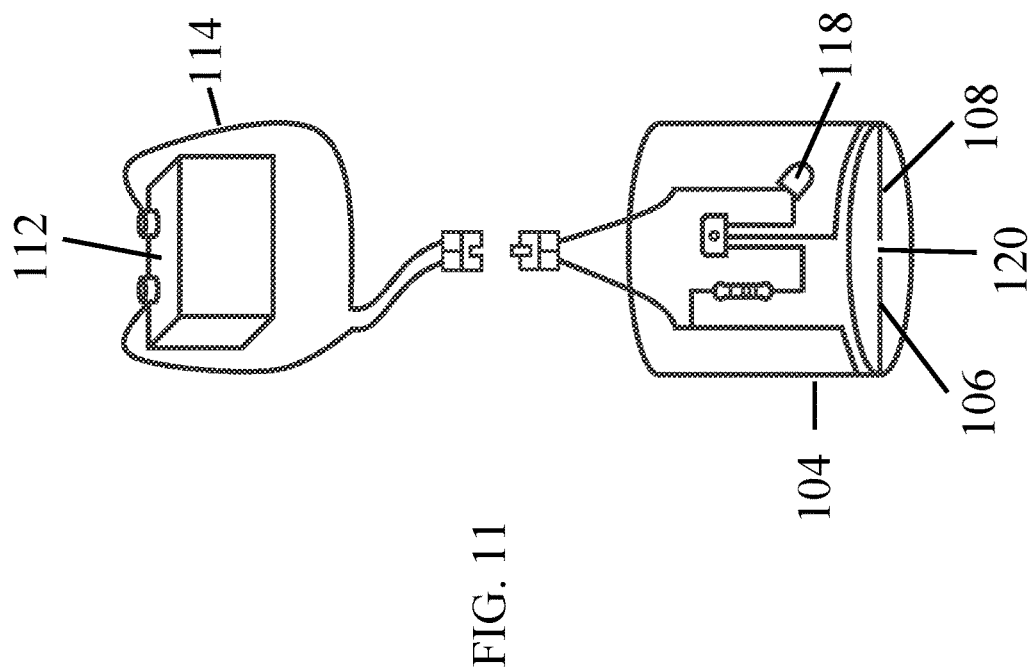
FIG. 11 is a schematic view showing one embodiment of the present invention.

FIGS. 5 and 11 show another embodiment that includes resistor 116 and transistor 122. As indicated above, housing 104 secures near the nozzle to place opening 120 in the flow path of the liquid from the nozzle. The liquid flows into opening 120 to close circuit 114. Power source 112 powers the flow indicator 118. The liquid closes the circuit 114 allowing electricity to flow across the flow indicator 118 to indicate that the nozzle is not clogged. If the flow is not sufficient to complete the circuit at opening 120, electricity is not supplied to flow indicator 118 such that flow indicator 118 is not powered.

FIGS. 5 and 11 show a system of clog detection devices 136, 138, 140 providing multiple indicators 118 placed at different nozzles. Each clog detection device 136, 138, 140 attaches in parallel with the power source 112. Each detection device 136, 138, 140 signals whether sufficient liquid flows across each opening 120 between the conductors 106, 108. The power source 112 powers the alert to signal that sufficient liquid is flowing across the opening 120 to complete the circuit such that nozzle is not clogged.

FIGS. 6-7 and 12-13 show additional embodiments of the system. Multiple flow detection devices 142, 144, 146, 148, 150, 152 install at different nozzles. The flow detection devices 142, 144, 146, 148, 150, 152 connect in parallel on circuit 114. These systems provide an indicator, such as indicators 118, 124, to indicate whether sufficient liquid is flowing through opening 120 to complete the circuit.

Figure 14:
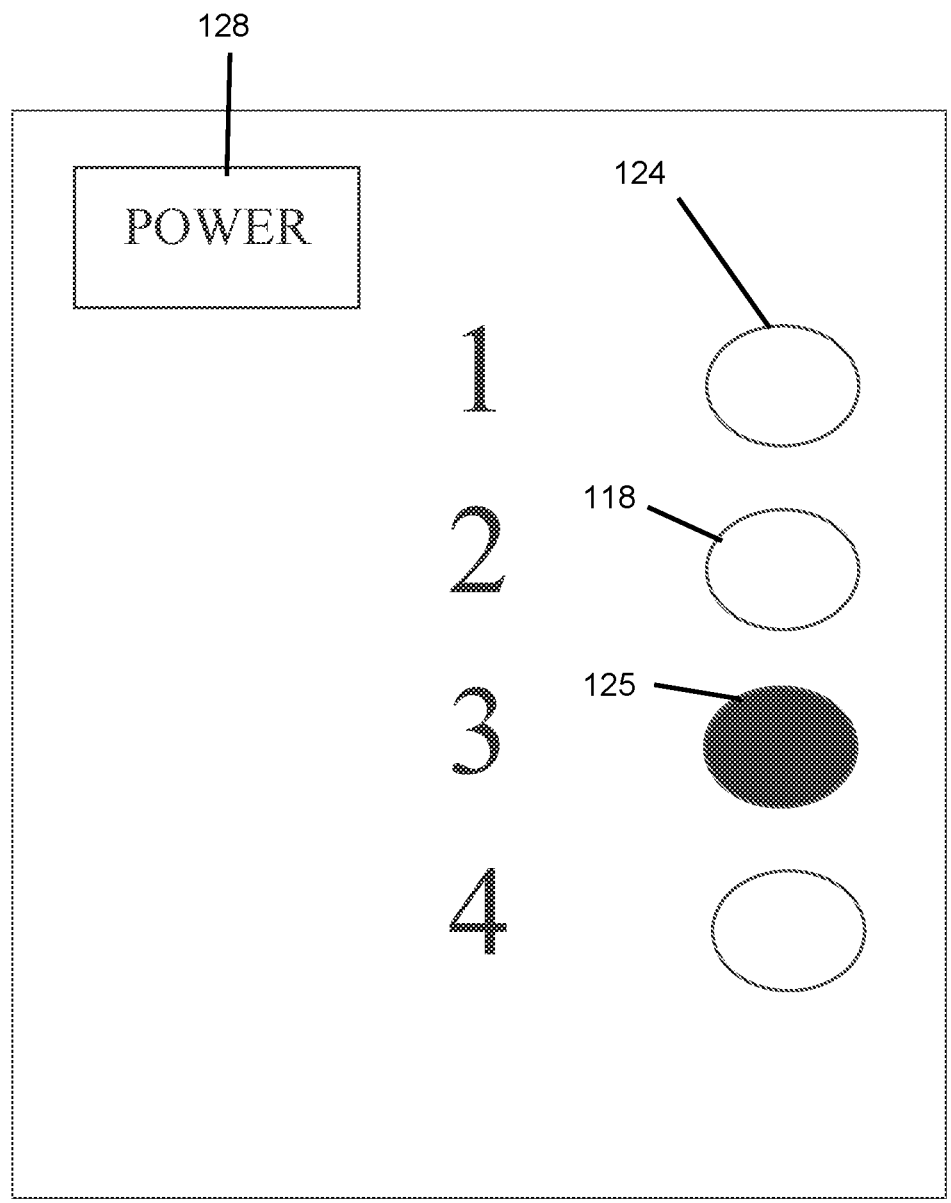
FIG. 14 is a top view of a monitor of one embodiment of the present invention.

One flow indicator 118, such as an LED, is placed near the nozzle 102. Another indicator 124 is placed on a monitor system 154 as shown in FIG. 14. Such a monitor system 154 provides a switch 126 that turns the system on and off. The monitor system 154 also provides a power indicator, such as a power light, pilot light, indicating that the system is turned on or off.

As discussed above, the flow detection devices are placed to locate the opening between conductors 106, 108 in the flow path of the liquid from the nozzle. The indicators 118, 124 indicate whether sufficient liquid is flowing through the opening 120 at conductors 106, 108. These flow detection devices 142, 144, 146, 148, 150, 152 provide the resistor. Flow detection devices 148, 150, 152 provide the transistor in addition to the resistor.

Each flow detection device installs on a nozzle. The flow detection devices detect whether the liquid flows from the nozzle to which the flow detection device is attached. In one embodiment, each flow detection device detects clogs on a single nozzle.

Flow indicator 118 alerts the user whether or not sufficient liquid is flowing from the nozzle to complete the circuit. In one embodiment, the indicator is a visual indicator, such as a light or LED. The flow indicator 118 may be positioned on a monitor, on the housing, or within the housing.

FIG. 14 shows the monitor 154 with indicators, such as alert indicator 124 and power indicator 128. Monitor 154 provides multiple indicators to indicate that the system is powered on and whether a clog is detected.

A power indicator indicates that the system is powered on. Alert indicator 124 indicates that an individual nozzle is properly functioning. The alert indicator 125 indicates that a nozzle is clogged and not functioning properly. The monitor 154 identifies any nozzles that are not functioning properly. The user can easily identify the nozzle to be examined. The user can then locate and repair the nozzle and continue spraying.

FIG. 14 also shows that alert flow indicators 118, 124 are powered on to indicate no clog at detection devices attached to a particular nozzle. The nozzle is functioning properly and liquid is properly flowing.

The monitor may have a wired connection with the flow detection devices. The monitor may also be a wireless monitor. The monitor has been shown with individual lights that alert the user. The system may also be implemented with a program that provides digital display with touch screen capabilities. A second monitor may also be connected to allow supervision of the system.

Figure 15:
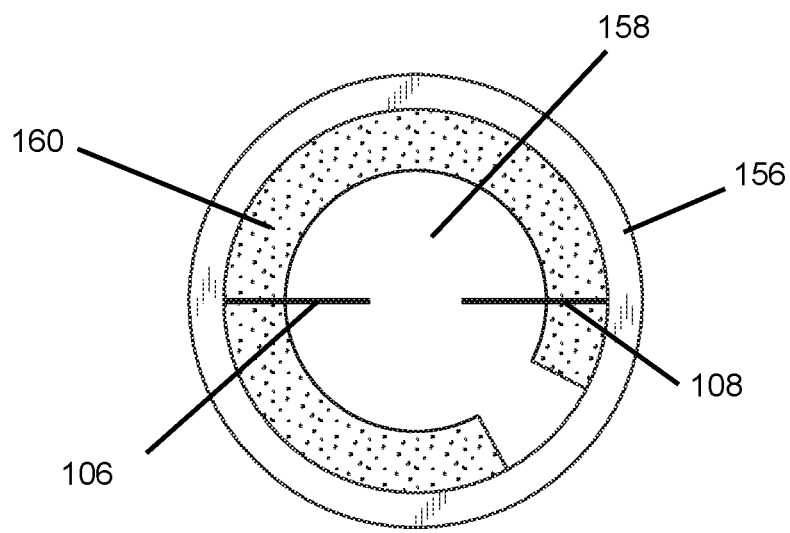
FIG. 15 is a bottom view of a flow detection device of one embodiment of the present invention.
Figure 16:
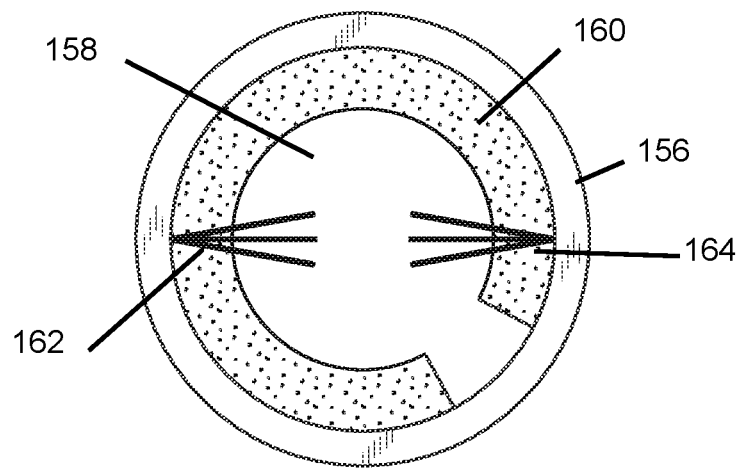
FIG. 16 is a bottom view of a flow detection device of one embodiment of the present invention.

FIGS. 15 and 16 show different embodiments of the nozzle detection device. One embodiment provides two conductors 106, 108 that form an incomplete circuit as shown in FIG. 15. The two conductors 106, 108 conduct electricity but do not contact each other. The conductors are stored within housing 156. The conductors 106, 108 extend radially inward towards housing aperture 158. Foam 160 located within the housing cushions the nozzle to reduce damage to the nozzle.

Another embodiment shown in FIG. 16 provides a first detection body 162 providing a set of three conductors that contact each other and a second detection body 164 providing a set of three conductors that contact each other. The conductors of each detection body conduct electricity. The conductors of the first detection body do not contact the conductors of the second detection body. The conductors of the first detection and the conductors of the second detection body form an incomplete circuit with each other.

The flow of the spray fluid completes the circuit between the two detection bodies. Similarly, the flow of the spray fluid completes the circuit between the two sets of conductors. The conductors are configured to detect clogs with minimum effect on the spray pattern and droplet size.

The alert indicators indicate whether a clog is detected. The visual alert indicators alternate between a clog alert and an unclogged alert. To distinguish between the clog alert and the unclogged alert, the system may use a flashing light, different colored lights, power on the indicator, or power off the indicator. In one embodiment, the system lights the indicator if a clog is detected. In another embodiment, the system lights the indicator if no clog is detected. The system can be developed according to the user's preferences.

The system has also been described with indicators, such as a visual or audible indicator. In another embodiment, a sensor may be implemented as the indicator. The sensor detects whether the circuit across opening 120 is open or closed. If the circuit across opening 120 is open, a clog has been detected as insufficient liquid flows across opening 120 between conductors 106, 108.

The system may also provide data logging. Such data logging can include which nozzle clogged, position at which the nozzle clogged, position at which the nozzle was repaired. Such data logging allows the user to pin point the areas at which the liquid was not applied.

The system may also provide real-time analysis of efficiency and economic impact.

The clog detection system may also be implemented to automatically turn on and off with activation of the sprayer's pump.

Future modifications and/or additions to the NCDD and NCDS will be implemented. These improvements will increase performance and efficiency, incorporate automation, and enhance user-friendliness. Such improvements, include but are not limited to:

detecting partial clogging; and adopting a lightweight and durable power source for the standalone models (A1 and B1).

From the foregoing, it will be seen that the present invention is one well adapted to obtain all the ends and objects herein set forth, together with other advantages which are inherent to the structure.

It will be understood that certain features and sub-combinations are of utility and may be employed without reference to other features and sub-combinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A device for detecting the flow of a fluid from at least one nozzle wherein the device detects the presence of the fluid in a flow path from the nozzle wherein the flow path defines a longitudinal axis, the device comprising:

a first conductor placed in the flow path of the fluid exiting the nozzle wherein the first conductor conducts electricity;

a second conductor placed in the flow path of the fluid exiting the nozzle wherein the second conductor conducts electricity wherein the second conductor does not contact the first conductor;

a power source electrically connected to the first conductor and the second conductor;

an opening extending laterally between the first conductor and the second conductor wherein the opening creates an open circuit with the power source wherein the first conductor and the second conductor extend laterally inwards towards the opening into the flow path;

a flow indicator electrically connected to the first conductor and the second conductor, the flow indicator providing a flow detected output indicating that the fluid is flowing from the nozzle, the flow indicator providing a clog detected output indicating that the fluid is not detected as flowing from the nozzle;

a housing attachable adjacent the nozzle wherein the first conductor and second conductor extend radially inward from opposite sides of the housing towards the opening such that the first conductor approaches the second conductor towards the opening.

2. The device of claim 1 wherein the flow indicator is secured to the housing.

3. A system for detecting the flow of a fluid from a first nozzle and a second nozzle wherein the system detects the presence of the fluid in a flow path from the nozzles wherein the flow path defines a longitudinal axis, the device comprising:

a housing configured to be secured to the first nozzle;

a housing aperture located in the flow path of the fluid exiting the first nozzle;

a first conductor placed in the flow path of the fluid exiting the first nozzle wherein the first conductor conducts electricity;

a second conductor placed in the flow path of the fluid exiting the first nozzle wherein the second conductor conducts electricity wherein the second conductor does not contact the first conductor;

a power source electrically connected to the first conductor and the second conductor;

an opening between the first conductor and the second conductor wherein the opening creates an open circuit with the power source;

wherein the first conductor and second conductor extend laterally inward from different sides of the housing such that the first conductor approaches the second conductor towards the opening without contacting the second conductor; and a flow indicator electrically connected to the first conductor and the second conductor, the flow indicator providing a flow detected output indicating that the fluid is flowing from the first nozzle to conduct electricity between the first conductor and the second conductor across the opening between the first conductor and the second conductor, the flow indicator providing a clog detected output indicating that the fluid is not detected as flowing from the first nozzle.

4. The system of claim 3 wherein the first conductor extends laterally inward from the housing into the housing aperture; and wherein the second conductor extends laterally inward from the housing into the housing aperture, the first conductor extending laterally towards the opening and the second conductor extending laterally inward towards the opening wherein the first conductor approaches the second conductor towards the opening, wherein the opening extends laterally between an end of the first conductor and an end of the second conductor wherein the flow path of the fluid exiting the nozzle travels through the opening.

5. The system of claim 4 wherein the flow indicator is a light that indicates that sufficient fluid is flowing from the first nozzle to complete the circuit at the opening wherein the light is powered on for the flow detected output to indicate that the fluid is completing the circuit.

6. The system of claim 4 further comprising:
the flow indicator placed adjacent the first nozzle to indicate a status of the first nozzle identifying if fluid is flowing from the first nozzle.

7. The system of claim 4 further comprising:
a second set of conductors placed in the flow path of the fluid from the second nozzle wherein the second set of conductors form an open circuit with the power source such that the second set of conductors do not contact each other, the second set of conductors connected in parallel with the first set of conductors;
a second flow indicator electrically connected to the second set of conductors, the second flow indicator providing a flow detected output indicating that the fluid is flowing from the second nozzle wherein the fluid conducts electricity across an opening between the second set of conductors, the flow indicator providing a clog detected output indicating that the fluid is not detected as flowing from the second nozzle wherein the second flow indicator detects whether electricity flows across the open circuit between the second set of conductors.

8. The device of claim 7 further comprising:
a monitor providing the flow indicators wherein the monitor provides a status of the two nozzles.

9. The device of claim 4 further comprising:
a first detection body providing the first conductor and two additional conductors wherein the conductors of the first detection body are electrically connected to each other, the first detection body electrically connected to the power source;
a second detection body providing the second conductor and two additional conductors wherein the conductors of the second detection body are electrically connected to each other, the second detection body electrically connected to the power source; and
the opening located between the conductors of the first detection body and the conductors of the second detection body wherein the opening creates the open circuit such that the conductors of the first detection body do not contact the conductors of the second detection body.

10. The device of claim 4 wherein the flow indicator is secured to the housing.

11. A method of detecting a flow of fluid from a first nozzle and a second nozzle, the method comprising:
attaching a housing adjacent the nozzle;
installing a first conductor in a flow path of said fluid exiting said first nozzle;
installing a second conductor in the flow path of the fluid exiting said first nozzle wherein the first conductor does not contact the second conductor, wherein the first conductor and second conductor extend radially inward from opposite sides of the housing;
connecting the first conductor and the second conductor to a power source;
creating an open circuit in the flow path of the fluid exiting from the first nozzle wherein the flow of the fluid in the flow path conducts electricity across the open circuit between the first conductor and the second conductor;
electrically connecting a flow indicator to the first conductor and the second conductor, the flow indicator providing a flow detected output indicating that the fluid is flowing from the first nozzle to conduct electricity across the open circuit, the flow indicator providing a clog detected output indicating that the fluid is not detected as flowing from the first nozzle.

12. The method of claim 11 further comprising:
installing a third conductor in a flow path of the fluid exiting the second nozzle;
installing a fourth conductor in the flow path of the fluid exiting the second nozzle wherein the third conductor does not contact the fourth conductor;
connecting the third conductor and the fourth conductor to the power source;
creating an open circuit in the flow path of the fluid from the second nozzle wherein the flow of the fluid in the flow path conducts electricity across the open circuit between the third conductor and the fourth conductor;
electrically connecting a second flow indicator to the third conductor and the fourth conductor, the second flow indicator providing a flow detected output indicating that the fluid is flowing from the second nozzle, the second flow indicator providing a clog detected output indicating that the fluid is not detected as flowing from the second nozzle.

13. The method of claim 11 wherein the fluid flowing from said first nozzle completes the open circuit between the first conductor and the second conductor.

* * * * *